G. P. VUONO.
SILK FINISHING MACHINE.
APPLICATION FILED FEB. 4, 1916.
1,212,854.
Patented Jan. 16, 1917.
4 SHEETS—SHEET 2.
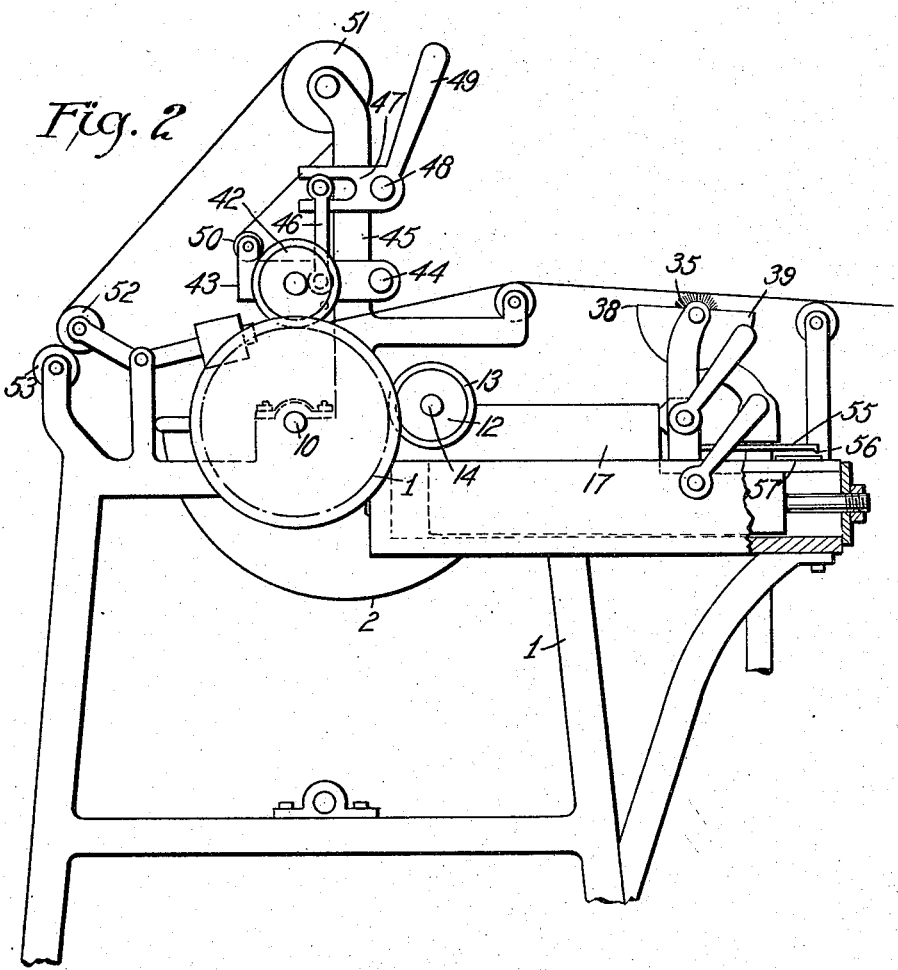
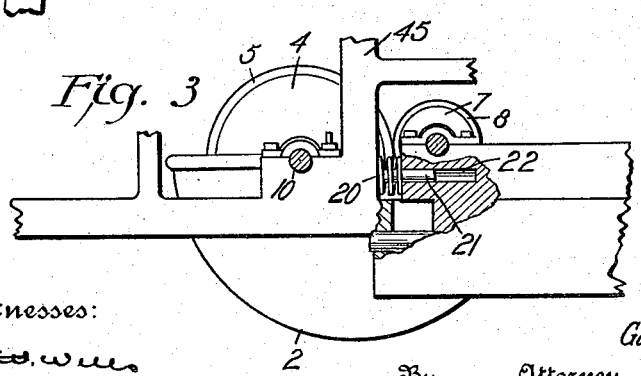
Witnesses:
Inventor
Giuseppi P. Vuono
By Attorney

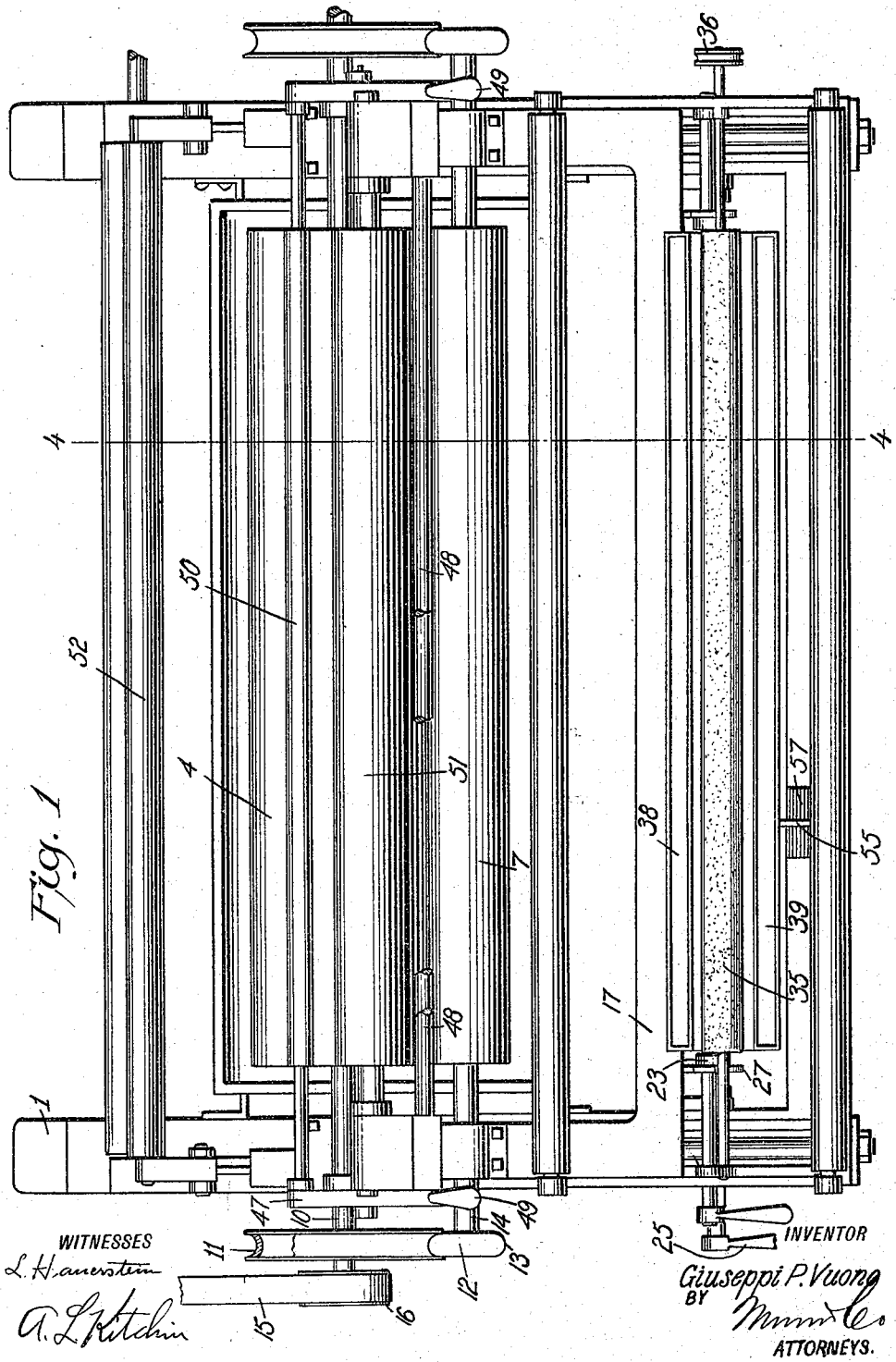

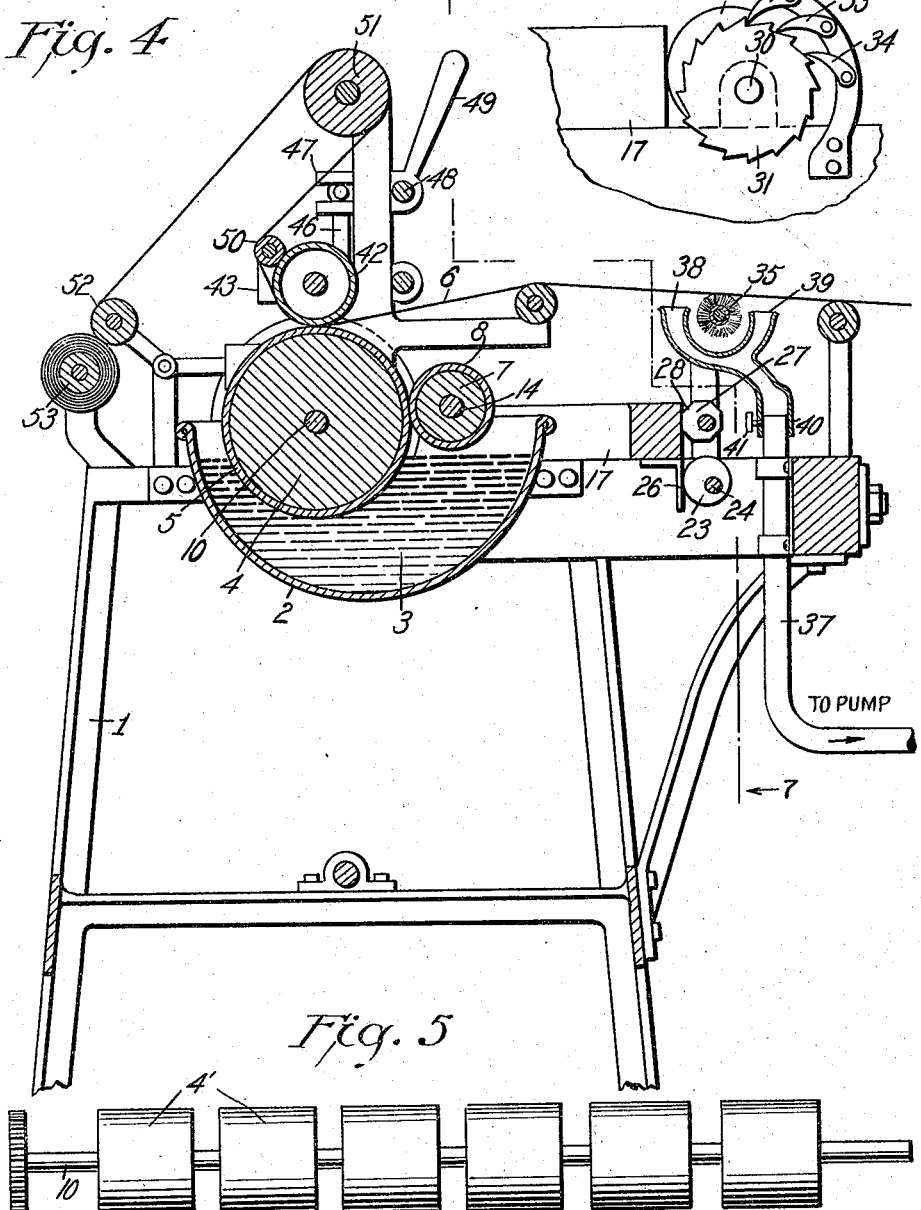
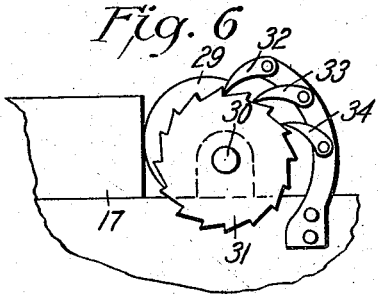

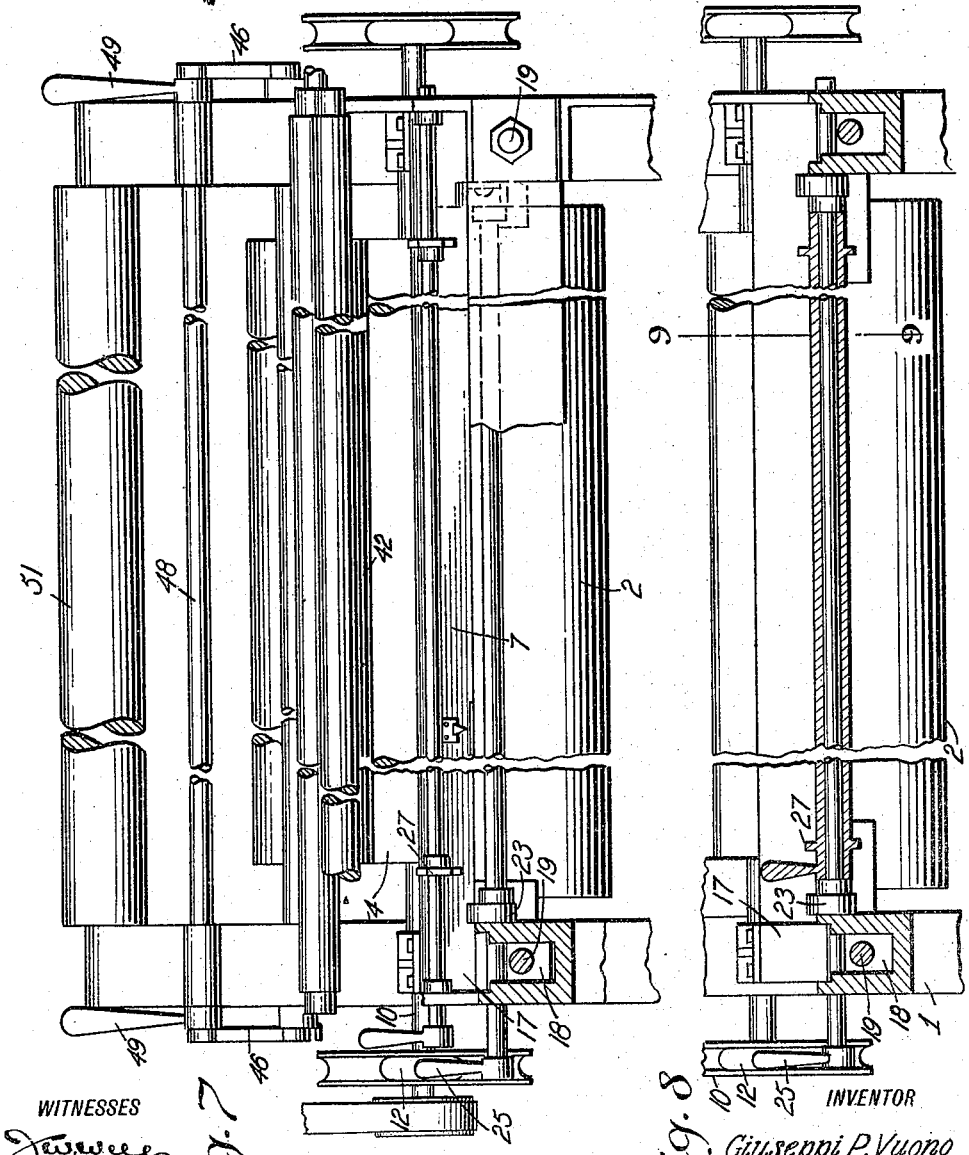

UNITED STATES PATENT OFFICE.

GIUSEPPI PETER VUONO, OF NEW YORK, N. Y.

SILK-FINISHING MACHINE.

1,212,854.   Specification of Letters Patent.   Patented Jan. 16, 1917.

Application filed February 4, 1916. Serial No. 76,115.

*To all whom it may concern:*

Be it known that I, GIUSEPPI P. VUONO, a citizen of the United States, and a resident of the city of New York, borough of the Bronx, in the county of Bronx and State of New York, have invented a new and Improved Silk-Finishing Machine, of which the following is a full, clear, and exact description.

This invention relates to silk finishing machines and has for an object the provision of an improved construction whereby the paste may be applied to the silk perfectly even and in any thickness desired.

Another object in view is to provide an adjusting mechanism for adjusting the controlling roller of the device and the association therewith of locking means for locking the controlling roller after adjustment.

A still further object in view is to provide an improved machine including in its construction a mechanical and a vacuum lint or dirt remover, whereby the silk is fed to the paste roller perfectly clean.

In the accompanying drawings:—Figure 1 is a top plan view of a machine embodying the invention. Fig. 2 is a side view of the machine shown in Fig. 1, part being broken away for better illustrating certain of the construction. Fig. 3 is a detail fragmentary side view of part of the machine shown in Fig. 2, certain parts being broken away for illustrating the slide and spring forming certain features of the invention. Fig. 4 is a transverse sectional view through Fig. 1 on line 4—4. Fig. 5 is a detail fragmentary view showing a slightly modified form of paste roller. Fig. 6 is a detail fragmentary side view of a slightly modified form of locking means for the slide carrying the feed roller. Fig. 7 is a sectional view through Fig. 4 on line 7—7. Fig. 8 is a detail fragmentary sectional view showing a modified form of the structure disclosed at the lower part of Fig. 7. Fig. 9 is a fragmentary sectional view through Fig. 8 on line 9—9. Fig. 10 is a modified form of the invention to that shown in Fig. 9.

Referring to the accompanying drawings by numerals, 1 indicates a frame which may be of any suitable kind and which is designed to support the various parts of the mechanism.

A receptacle or container 2 is arranged on the frame and is designed to contain a silk finishing paste 3 of any desired kind, which paste is continually supplied to the paste roller 4 by reason of the fact that the paste roller is partially submerged. The roller 4 may be of any desired construction and is covered by a rubber member 5 which picks up the paste 3 and would ordinarily deliver the same to the silk strip 6 except for the control roller 7, which control roller is provided with a rubber covering 8. The paste control roller 7 is positioned at a predetermined distance from roller 4 and thereby squeezes out or prevents all but a certain amount of the paste from passing upwardly to the silk strip 6.

Different grades of silk and different grades and conditions of paste 3 necessitate readjustment of the roller 7 so that the same will approach nearer roller 4 or recede therefrom. These adjustments must be very small, as the slightest difference in the thickness of paste will produce quite different results on the silk. Ordinarily the extreme adjustment of the roller 7 is not more than one-eighth of an inch and sometimes is a very small fraction of that distance. As ordinarily these two rollers are quite long, as for instance six or seven feet, the adjustment must be made throughout the length of the roller at one time or the roller will be canted or pressed to one side. This would result in part of the silk being supplied with a large amount of paste and part a smaller amount, thus producing an inferior finishing of the silk.

In connection with silk finishing machines it is to be noted that the way the paste is applied thereto determines to a large extent the value of the finished silk. For this reason a particular construction of support and guide has been provided for the roller 7 and also a particular construction of feed for the guide shown especially in Figs. 2, 3 and 4.

The rollers 4 and 7 may be connected together by gearing at the end, or other means, so that they will properly rotate. Instead of using gearing a wheel 9 may be rigidly secured to the shaft 10 of roller 4, said wheel being covered by a rubber band 11 designed to be engaged by rubber band 12 on the wheel 13, which wheel is connected to shaft 14, said shaft being rigidly secured to the roller 7. This causes a positive drive for roller 7, shaft 10 receiving power from any suitable source, as for instance, from the belt 15 and pulley 16 driven by any suitable source of power. If the roller 7 was not positively driven it would be necessary to move the same so as to press against roller 4. If this was done the paste would be almost entirely squeezed off of the roller 4 and would, in addition, negative any idea of providing different amounts of paste for different quantities of silk.

Roller 7 is journaled in suitable journal members on a slide 17, which slide is provided with depending members 18 (Figs. 2 and 7) which depending members are provided with apertures through which the guide rods 19 extend. It is understood that slide 17 is substantially U-shaped, as shown in Fig. 1, and is provided with a depending member 18 on each end engaging the respective rods 19 whereby there cannot be any twisting of the guide or any twisting of the roller 7 but merely a movement directly toward or from roller 4. In the work of coating sheet metal or other material, as for instance, shingles, boards and the like, a fine adjustment is not necessary, as a little more or less paint, dye or the like would not injure the metal, shingles, boards and the like, whereas this adjustment is absolutely necessary to produce the best results in silk finishing, as too much or too little paste at any point would produce a different finish on the silk noticeable by any one examining the same, as the "feel" of the silk is different.

The depending members 18 and the rods 19 operate to hold the guide 17 against accidental side movements in any direction; that is, against a lateral movement or an up and down movement. As shown in Fig. 3 there is provided a spring 20 on each end of the guide 17, said springs surrounding pins 21 adapted to fit into sockets 22. There has been shown only one spring 20 but it is of course evident that there is a spring on each end of the guide 17, otherwise the guide would not move. These springs give a continuous tendency to the guide to move away from the paste roller 4. In order to regulate the distance of the control roller 7 on the paste roller 4 a pair of cams 23 are provided and connected to shaft 24 which may be rotated by a suitable handle 25. The cams 23 operate against a stop 26 connected to guide 17 so as to force the guide toward the paste roller 4. A pair of locking cams 27 are provided above the cams 23, said locking cams having flat surfaces 28 arranged thereon which engage the guide 17 and lock the same against further return movement. By this arrangement no separate fastening means are necessary to prevent any accidental shifting of the position of the guide. Other means may be provided for locking the guide provided they accomplish the same purpose as member 27.

In Fig. 6 will be seen a modified form of the invention designed to lock the guide 17 against shifting its fixed position. In this figure a cam 29 is provided bearing against the guide 17, said cam being very similar to cam 23. This cam is rigidly secured to shaft 30, which shaft also carries a ratchet wheel 31 designed to be engaged by pawls 32, 33 and 34. These pawls are spaced apart so that only one pawl will be in proper engagement at a given time. This will increase the degree of adjustment for three times the number of teeth on the ratchet wheel and when the parts are adjusted the cams are locked against return movement.

As shown more particularly in Figs. 1 and 4, a cleaning system is provided for cleaning the silk of lint and other objectionable matters immediately before the paste is applied, whereby a more even spreading and a thorough saturation of the silk will result. As shown in these figures, a rotating brush 35 is provided which may be rotated by pulley 36 driven from any suitable source or rotated by any other suitable power. Preferably the direction of rotation of the brush 35 is in an opposite direction to the movement of the silk strip 6, though this is not absolutely necessary. A pipe 37 having mouths 38 and 39 is connected to the upper part of the frame 1 so that the mouths 38 and 39 will be on opposite sides of brush 35 and near the silk 6. Pipe 37 is connected to a suction pump or a vacuum tank whereby the lint and other matter dislodged or loosened from the silk 6 will be drawn into the pipe and thereby bodily removed from the vicinity of the silk. The distance of the mouths 38 and 39 from the silk may be adjusted or varied according to circumstances so as to allow the silk to be moved past the mouths properly while allowing the suction to remove the objectionable matter sometimes found on the silk. If desired, part of the pipe carrying the mouths 38 and 39 may be formed with an enlarged portion 40 having a set screw 41 therein, said enlargement telescoping over part of pipe 37 and locked thereto by set screw 41, whereby the mouths are locked at any desired distance from the silk.

In operation the silk is threaded through the machine as shown, for instance, in Fig. 4, and the suction pump started. As the paste roller 4 is rotated the same will drive roller 7, whereby the amount of paste supplied to the silk will be gaged. A presser roller 42 is provided which presses the silk against the paste roller 4. This presser roller is carried by a pair of arms 43 pivotally mounted on the shaft 44, which shaft is connected with a support 45 in any suitable manner. The arms 43 have links 46 connected therewith, which links are engaged by bifurcated members 47, which bifurcated members are in turn connected with shaft 48. Each of the bifurcated members 47 is preferably provided with an operating handle 49 whereby when either handle is moved the shaft 48 will be rocked and movement will be transmitted to the presser roller 42 for raising or lowering the same, as may be desired. The arms 43 carry a guiding roller 50 over which the silk is passed after it leaves the paste roller 4, the silk passing from said guide roller to a comparatively large guide roller 51 and then over a weighted guide roller 52 to the spindle or roller 53 on which it is to be wound, as shown more particularly in Fig. 4. The spindle or roller 53 may be rotated by any suitable means so as to take up the silk as fast as the same is moved through the machine by the action of the paste roller 4 and associated parts. It is to be noted that rollers 4 and 7 are positively driven while roller 42 is not positively driven but acts merely as a presser roller for forcing the silk against the paste roller sufficiently to cause the paste to be pressed into the silk and thereby produce the proper finish. If the control roller 7 was not positively driven by means as shown in Fig. 1, by gears or other suitable means, it would not rotate unless pressed against the paste roller 4 with a sufficient degree of pressure to squeeze out practically all of the paste, thus destroying the design of the machine.

As shown in Figs. 1 to 4, inclusive, the paste roller 4 is one continuous roller, whereas in Fig. 5 will be seen a slight modified form of paste roller which is divided into small sections with a space between the sections. The various rollers 4' in Fig. 5 are designed to receive narrow strips of silk whereby a large number of distinct strips may be fed through the machine at one time and properly finished. If a narrow strip of silk was passed through a machine having a large roller the unused paste on the roller at each edge of the strip of silk would flow over the edge of the silk on to the back and thereby produce an undesirable finish. By forming the paste roller 4' as shown in Fig. 5 the surplus paste may readily pass off through any of the spaces 54 and drop back into the paste receptacle 2.

As shown in Figs. 1 and 2, an indicating arm 55 is provided having a pointer 56 arranged to move over a scale 57 for showing the amount of adjustment of the guide 17, the indicating arm 55 being rigidly secured to the guide 17 while the scale 57 is rigidly mounted on part of the supporting framework.

What I claim is:

1. In a silk finishing machine of the character described, a container for receiving paste, a paste roller, a presser roller for pressing the silk fed through the machine against said paste roller, a controlling roller for controlling the amount of material taken up from said container and applied to the silk, a guide for supporting and guiding the movement of the controlling roller toward and from the paste roller, means acting on the guide for giving the same a tendency to move away from the paste roller, a cam for adjusting the position of the guide against the action of said means, and an eccentrically mounted many-sided member arranged so that one of the sides will engage said guide for locking the guide in its adjusted position.

2. In a silk finishing machine of the character described, a paste roller, a container for receiving paste which is adapted to be taken up by the paste roller, a presser roller pressing the silk fed through the machine against said paste roller, a controlling roller for regulating the amount of paste applied to said silk, a supporting and guiding member for supporting and guiding the controlling roller, an eccentric adapted to move the guiding member toward said paste roller, and an eccentric locking member having a plurality of flat faces adapted to engage said guiding member at different times according to the position to which it has been moved by the eccentric member.

3. In a silk finishing machine of the character described, a paste receptacle, a paste roller for receiving paste from the receptacle, a presser roller for pressing silk against the paste roller, a controlling roller, a sliding guide for supporting the controlling roller and for moving the same toward and from the paste roller, resilient means acting on said guide for forcing the same away from the paste roller, a fixed stationary pin for guiding the resilient means, said pin extending into a bore in the guide whereby the guide is held against any movement except a movement toward and from the paste roller, means for moving the guide toward the paste roller, and means for locking the guide against a return movement.

4. In a silk finishing machine of the character described, a paste roller, means for controlling the amount of paste supplied thereto, a container for supplying paste to the paste roller, a presser roller, means for guiding the silk to the presser roller, and means for removing lint and other foreign matter from the silk as the silk passes to the presser roller, said means including a brush and a suction member.

5. In a silk finishing machine of the character described, a paste container, a presser roller, a controlling roller, means for guiding silk to the presser roller, and a vacuum or suction member arranged with an open mouth adjacent one side of the silk as the same passes to the paste roller whereby lint and other foreign matter is removed from the silk immediately previous to its passage to the presser roller.

6. In a silk finishing machine of the character described, a paste receptacle, a paste roller, a presser roller, a paste controlling roller, means for guiding silk so that the same will pass over said paste roller, a brush arranged on one face of the silk for removing lint and other matter therefrom, a suction pipe, and means presenting a pair of mouths adjacent said silk, there being one mouth on each side of the brush whereby all the lint and other foreign matter loosened by the brush may be bodily removed.

7. In a silk finishing machine of the character described, a paste receptacle, a paste roller, a controlling roller, a presser roller, means for guiding silk between the presser roller and the paste roller so that the paste will be applied to the silk, a suction pipe, and an adjustable mouth piece therefor, said mouth piece being adjustably positioned near one face of the silk for removing lint and other foreign matter therefrom.

In testimony whereof I have signed my name to this specification in the presence of two subscribing witnesses.

GIUSEPPI PETER VUONO.

Witnesses:
 FRED C. FISCHER,
 WILLIAM A. SCHAPPERT.

Copies of this patent may be obtained for five cents each, by addressing the "Commissioner of Patents, Washington, D. C."